ered.
UNITED STATES PATENT OFFICE.

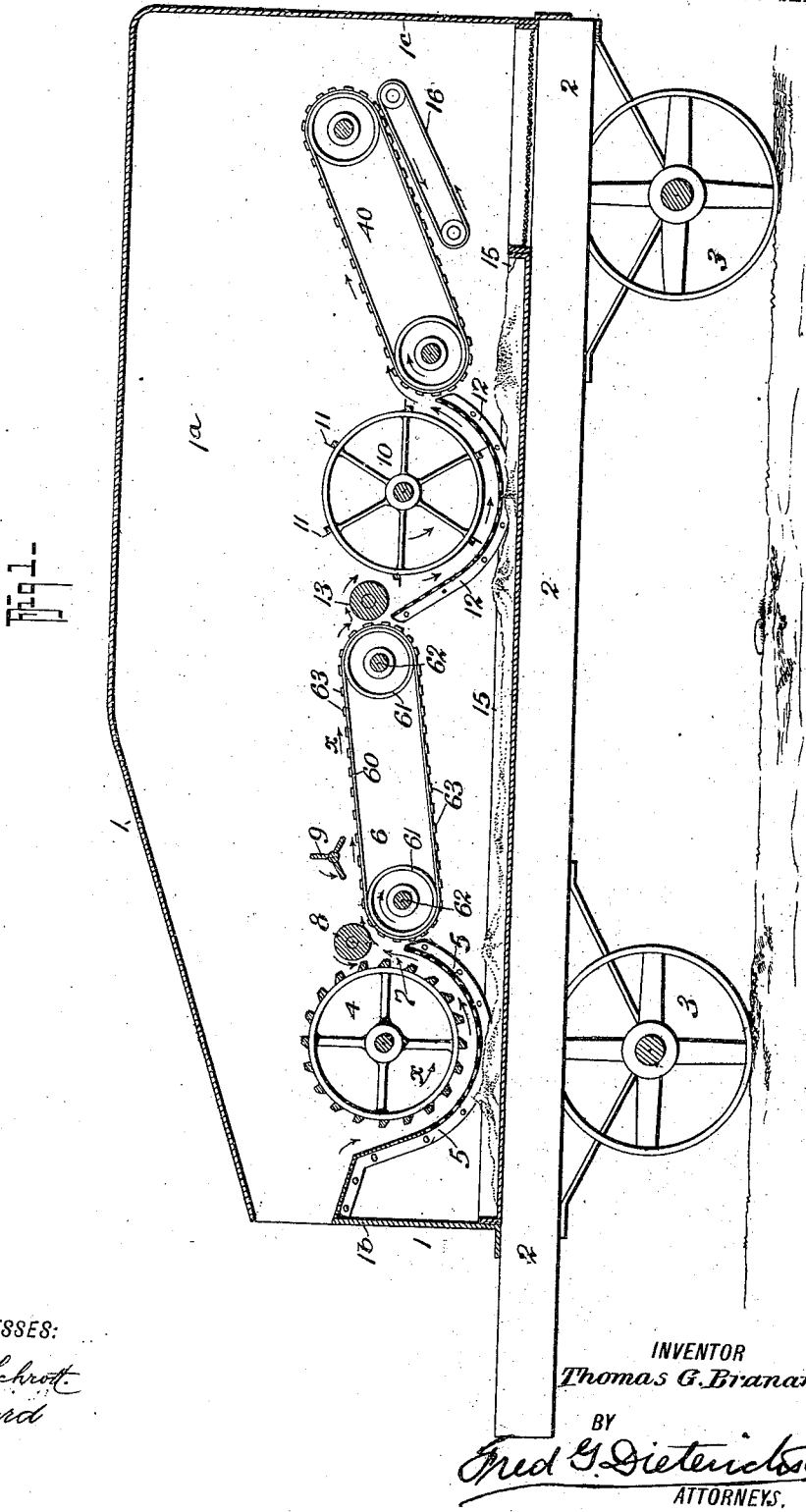

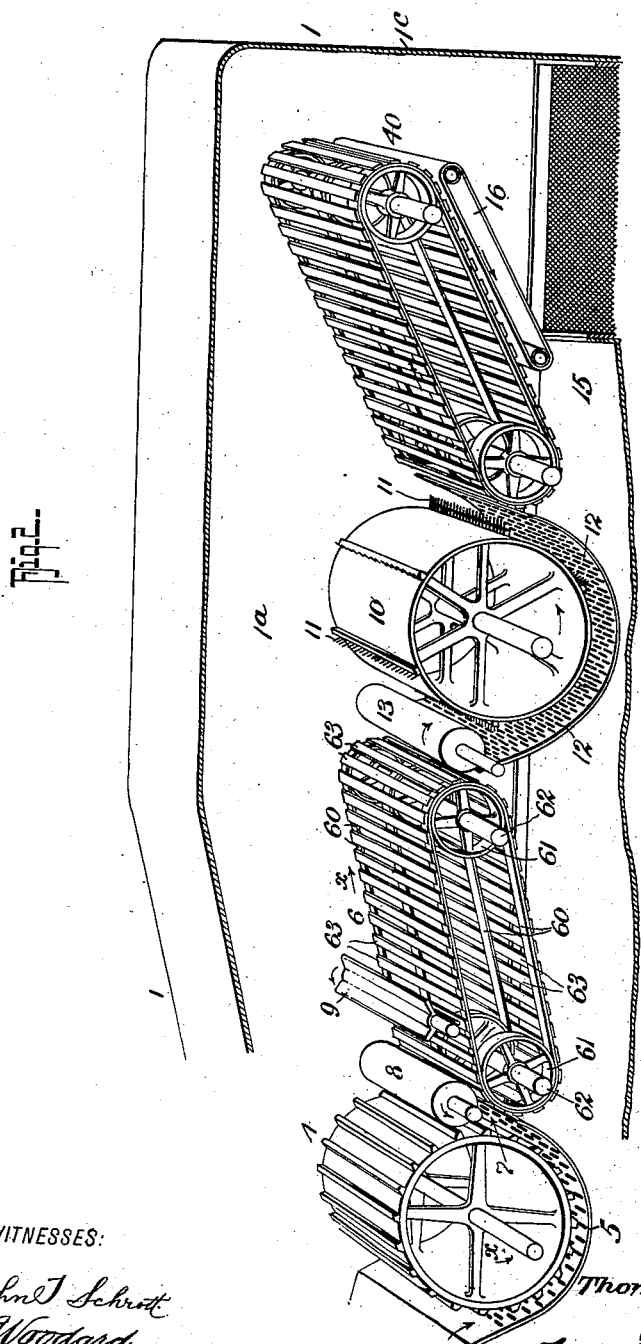

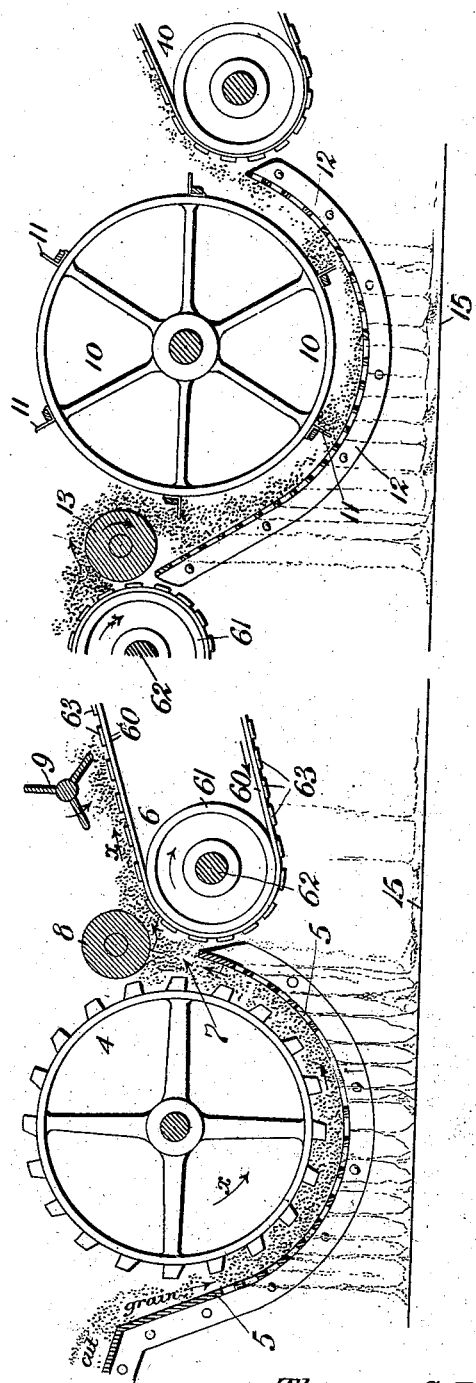

THOMAS G. BRANAMAN, OF HUTCHINSON, KANSAS, ASSIGNOR OF ONE-HALF TO ROBERT W. CRIPPEN, OF ARLINGTON, KANSAS.

THRESHING-MACHINE.

No. 896,080.   Specification of Letters Patent.   Patented Aug. 18, 1908.

Application filed May 14, 1907. Serial No. 373,634.

*To all whom it may concern:*

Be it known that I, THOMAS G. BRANAMAN, residing at Hutchinson, in the county of Reno and State of Kansas, have invented certain new and useful Improvements in Threshing-Machines, of which the following is a specification.

My invention, which in general relates to improvements in threshing machines, more particularly seeks to provide an improved means for separating the chaff, straw and other extraneous matter from the grain kernels in a quick and economical manner, and in the use of which the separations from the grain are prevented from falling into the grain pan.

With the above objects in view and other objects to be hereinafter explained my invention, in its generic nature, comprises an improved means that coöperates with the threshing cylinder, in the nature of a pair of endless aprons, disposed in the same longitudinal plane, a drum located between the said aprons, a beater roll located between the drum and the discharge end of the first one of the aprons, a supplemental beater at the receiving end of the said first apron, and a screen that coöperates with the drum, the beater roll, and the last or final discharging apron, the several parts having such correlation whereby to cause the straw to travel through the machine at a high rate of speed, for example, at a rate of 250 feet per minute, and in which the parts are so related and mounted that they have no lateral vibration.

In its specific nature, my invention consists in certain details of construction and peculiar combination of parts, all of which will be hereinafter fully explained and particularly pointed out in the appended claims and illustrated in the accompanying drawings, in which:

Figure 1, is a longitudinal section of a machine embodying my invention. Fig. 2, is a diagrammatic perspective view of the several parts that coact and form a complete assemblage of my construction. Fig. 3, is a detail longitudinal section of the receiving end of the machine. Fig. 4, is a similar view of the delivery end of the machine.

In the practical application, my invention comprises means that may be stationarily held or be portably arranged, the latter arrangement being the preferred one, to provide for readily conveying the machine about the field.

When assembled, as shown in Fig. 1, 1 designates the main casing, formed of the sides $1^a$, the closed front and rear ends $1^b$—$1^c$, supported on the longitudinal truck frame beams 2, mounted on the wheels 3, as shown. At the receiving or feeding end of the machine is mounted a threshing cylinder 4, preferably a twenty bar cylinder that operates over the usual form of concave 5.

6 designates, what is hereinafter termed the first endless apron, consisting of a series of endless, flexible bands 60, that pass over the band pulleys 61—61, mounted on the shafts 62—62 disposed parallel with the cylinder 4, and a series of transverse slats 63 fastened to the bands 60, the said shafts 62 being geared or belted with the driving mechanism of the machine in any approved manner, to impart motion in direction of the arrow $x$.

By referring now more particularly to Fig. 1, it will be observed the apron 6 inclines slightly upward from its front end, and the said end is in close proximity to the discharge or throat 7 formed between the cylinder 1 and the concave 5, said throat 7 being substantially in the horizontal plane of the cylinder axis, and the axis of the adjacent shaft 62, such relation of parts being provided so that the material, as it leaves the cylinder, instantly passes onto the apron 6 to be continued without impediment in its swift forward course.

To positively prevent the material as it leaves the throat 7 from being thrown up by centrifugal force and to instantly place it in contact with the rapidly forwardly moving rake 6, I have provided, what I term, a beater and presser roller 8, which rotates in the direction indicated. This roller forms a closure member or check against the material being thrown up and out of proper engagement with the separating means, and since it rotates as stated, it not alone guides the material as it leaves the throat 7 onto the apron 6, but materially aids in the forward ejection or feed of the said material. The roller 8 has a further function, since by reason of the material being thrown against it with considerable force as it passes from the concave, a considerable separation of the grain from the straw etc. is effected, which drops down either between the concave and the front end of the apron 6 or back onto the grain pan. To further provide for a separation of the grain from the straw etc. a beater 9 is mounted over the apron 6 near the roller 8, so as to engage the material as it passes from the said roller 8, said beater being of the radial blade kind and driven to rotate in the direction of the arrow, to also aid in the quick, forward travel of the material, it being understood that the grain separations that occur while the material is passing over the apron 6, drop through the said apron in the grain pan.

10 designates a feeding drum, in practice about thirty-four inches in diameter, and which is geared with the driving mechanism in any suitable manner to be rotated at a high speed. This drum has a series of radially projecting rake teeth 11, and the said drum and its teeth coöperate with an open grate concave 12 disposed, in practice, about five inches from the periphery of the drum 10. The axis of the drum is disposed in the horizontal plane of the cylinder axis and the receiving end of the concaved grate 12 extends up beyond the axis of the said drum to a point near the delivery end of the apron 6 and in close proximity to the said apron, as clearly shown in Fig. 1, by reference to which it will be also noticed that a supplemental feed roller 13 is mounted at the discharge end of the apron 6, the axis of the said roller being in a plane slightly above the axis of the upper shaft of the apron 6, and mounted over the space between the discharge end of the said apron and the receiving end of the concave 12, and with its delivery face projected over the edge of the concave and in close proximity of the drum 10, it being so positioned that the apron teeth in the drum will just clear it for reasons presently explained.

The roller 13 in practice is about six inches in diameter, while the pulleys for the bands of apron 6 are about ten inches in diameter, and by reason of such relative sizes of the pulleys and the roller 13 and the manner in which they are mounted the receiving face of the roller 13 is in a plane below the discharge end of the apron, and thus provides, as it were, a pocket to receive the material as it passes from the apron 6, and this causes it in its transit to bunch sufficiently at this point to cause the roller 13 and the drum 10 and its teeth to positively force the material into the receiving end of the concave 12, it being obvious that the roller 13, the drum and its teeth in engaging the material tend to cause a further separation of the grain therefrom and the bulk of the grain separations to fall on the grated concave 12 and through it on the grain pan. To still further separate the grain from the straw and other trash, the discharge end of the concave 12 is stopped at a point below the axis of the drum 10, and in close proximity to the lower or receiving end of a second endless apron 40, which is constructed similar to apron 6, but is held at a greater incline to cause the separated grain, separated while the straw is passing up, to drop into the pan 15, and to collect the said grain that may pass up over the discharge end of the apron 40, a supplemental endless conveyer 16 is mounted under the upper end of said apron 40 which catches and leads the grain down into the pan 15. The straw and trash that pass off the second apron may be taken up by screens sieves or shaking means or lead to the shaking means as desired.

From the foregoing description taken in connection with the drawings, the complete construction, operation and advantages of my invention are believed to be apparent.

By reason of the correlation of the parts as stated and shown, means are provided for continuously moving the straw etc. at a high speed, and since the drum 10 in practice, is revolved at about five hundred revolutions per minute, it takes up the material as fast as it is fed along by the apron 6, the engagement of the material with the several beater and guide rolls and with the two aprons and the grated concave effecting the separation of the grain from the straw, chaff and other trash, so completely that the same when it leaves the second apron can be carried off to the stacker.

While I prefer the detailed arrangement of the several parts as shown, it is manifest the same may be modified or varied in the specific construction and combination shown without departing from the scope of the appended claims.

Having thus described my invention, what I claim and desire to secure by Letters Patent is:

1. In a separating means of the character described, the combination with the endless apron 6, the gathering drum, the grated concave that coöperates with the drum, said concave having its end extended above the axis of the drum and positioned near the discharge end of the apron; of a feed roller mounted between the delivery end of the apron 6, and the drum, said feed roller having its discharge face projected over the receiving end of the grated concave and its receiving face disposed in a plane below the discharge end of the apron 6, as set forth.

2. The combination with a pair of endless inclined endless aprons disposed in longitudinal alinement; of a drum located between said aprons, a grated concave that coöperates with the drum having its receiving end disposed adjacent the discharge end of one of the aprons, and its discharge end disposed at the receiving end of the other apron, and a guide roller located between the discharge end of one of the aprons and the drum, said roller being disposed with its receiving face in a plane below the said discharge end and its delivery face projected over the receiving end of the grated concave as set forth.

3. The combination of the endless inclined aprons, the drum located between said aprons, said drum having a series of transverse and radially projected rake teeth, a grated concave that coöperates with the drum, having its discharge end arranged to deliver onto the receiving end of one of the endless aprons, the receiving end of the said concave being disposed adjacent the discharge end of the other apron and a roller located at the discharge end of the first apron in a plane below its delivery, said roller being located above the receiving end of the concave, substantially as shown and described.

4. A separating means of the character described, comprising in combination with the threshing cylinder and the coacting concave, a pair of endless conveyers, disposed in longitudinal alinement, the receiving end of the first conveyer being disposed to receive the material from the concave, a rotary combined check and feed roller mounted over the receiving end of said first conveyer to deflect the material thereon, a drum disposed between the delivery end of one conveyer and the receiving or entrant end of the other conveyer, said drum having radial teeth, a grated concave that coöperates with the drum, a roller located at the delivery end of the first slatted conveyer, in a plane below the discharge point thereof, and having its delivery face projected over a grated concave, that coöperates with the drum, said concave discharging onto the second endless conveyer and a catch pan for the grain separated all being arranged substantially as shown and for the purposes described.

THOMAS G. BRANAMAN.

Witnesses:
   G. E. BOTLIN,
   H. D. GEORGE.